United States Patent
Toal

(10) Patent No.: US 10,860,377 B2
(45) Date of Patent: Dec. 8, 2020

(54) TECHNOLOGIES FOR IDENTIFYING THREAD MEMORY ALLOCATION

(71) Applicant: salesforce.com, inc., San Francisco, CA (US)

(72) Inventor: Brian Toal, San Francisco, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 205 days.

(21) Appl. No.: 15/466,072

(22) Filed: Mar. 22, 2017

(65) Prior Publication Data

US 2018/0276042 A1    Sep. 27, 2018

(51) Int. Cl.
G06F 9/50 (2006.01)
G06F 11/30 (2006.01)
G06F 11/34 (2006.01)

(52) U.S. Cl.
CPC ........ G06F 9/5016 (2013.01); G06F 11/3006 (2013.01); G06F 11/3017 (2013.01); G06F 11/3037 (2013.01); G06F 11/3409 (2013.01); G06F 11/3433 (2013.01); G06F 11/3442 (2013.01); G06F 2201/81 (2013.01)

(58) Field of Classification Search
CPC ............. G06F 11/3006; G06F 11/3017; G06F 11/3433; G06F 11/3442; G06F 9/5016
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Jack Shirazi, Garbage Collection JMX Notifications, Feb. 24, 2016 (Year: 2016).*

Primary Examiner — Jorge A Chu Joy-Davila
(74) Attorney, Agent, or Firm — Schwabe Williamson & Wyatt

(57) ABSTRACT

Systems, methods, and computer-readable media for identifying and managing memory allocation for one or more threads are described. A computer system may detect that a threshold memory utilization has been met, and may determine an aggregate memory allocation for a thread. The aggregate memory allocation may be a difference between a first memory allocation for the thread at a first time that the threshold memory utilization was met and a second memory allocation for the thread at a second time that the threshold memory utilization was met. The computer device may provide an indication that the thread has met or exceeded a threshold memory allocation when the aggregate memory allocation is greater than or equal to the threshold memory allocation. The computer device may disable the thread when the aggregate memory allocation is greater than or equal to the threshold memory allocation. Other embodiments may be described and/or claimed.

20 Claims, 5 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,424,589 B1 * | 9/2008 | Pliss ................ G06F 12/0253 707/999.202 |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,032,410 B1 * | 5/2015 | Kumpera ............... G06F 9/485 718/102 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0123303 A1 * | 6/2004 | Trotter ................. G06F 9/5016 719/315 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0064687 A1* | 3/2006 | Dostert ............... G06F 11/3409 718/1 |
| 2006/0259528 A1* | 11/2006 | Dussud ............... G06F 12/0276 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0224444 A1* | 8/2016 | Okada ................ G06F 11/0709 |
| 2017/0308449 A1* | 10/2017 | Mangione-Tran .... G06F 3/0608 |

\* cited by examiner

US 10,860,377 B2

TECHNOLOGIES FOR IDENTIFYING THREAD MEMORY ALLOCATION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to managing and accounting for memory and processor utilization in computing systems.

BACKGROUND

In multi-tenant database systems, tenants may share database and/or application resources. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields.

The owner/operator of a multi-tenant database system, or other service providers, may provide development platforms, environments, and/or application programming interfaces (APIs) that allow tenants to develop applications, which utilize data in their tenant space. However, some of these applications may include code or threads that contribute to relatively high resource utilization, for example, high memory allocation. This may lead to poor application performance for the tenant and/or other tenants of the multi-tenant database system. Many systems include APIs that provide information regarding the memory allocation for specified threads at specified times, but do not typically provide metering/monitoring information that would indicate a particular application that causes high memory utilization.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
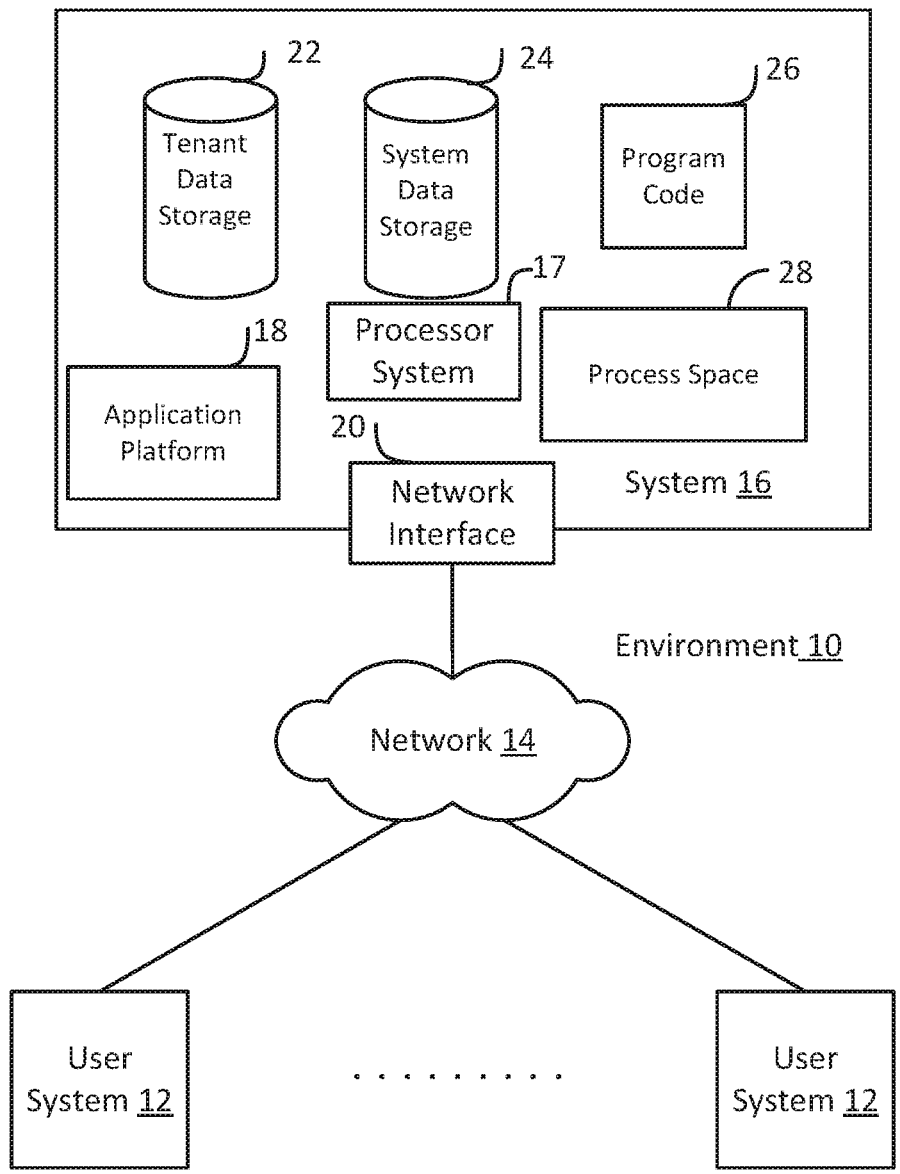
FIG. 1A shows a block diagram of an example environment in which an on-demand database service can be used according to some implementations.

Embodiments discussed herein are directed to computing systems, for example, multi-tenant database systems, and in particular to managing and accounting for memory utilization/allocation in computing systems. In many scenarios, applications that are developed to interact with computing systems, such as multi-tenant database systems, may include code and/or threads that may cause relatively high resource (e.g., processor and/or memory) utilization, which may lead to poor application and/or system performance. In many implementations, memory management algorithms, such as garbage collection (GC) processes, may be triggered or initiated when a system's memory allocation reaches a threshold point. Typically, application code has to be paused while such memory management algorithms (e.g., a GC process) are operated. Therefore, if a system spends too much time in operating a memory management algorithm (e.g., a GC cycle), system performance may be diminished and/or user perception of system performance may be degraded. Many systems, such as those that implement Java Virtual Machine (JVM), may include an application programming interface (API) and/or libraries that provide information regarding the memory allocation for specified threads at a specified time (e.g., when functions of the APIs/libraries are called), but do not typically provide metering/monitoring information (e.g., metadata) that would indicate a particular application that causes high resource utilization.

In disclosed embodiments, a thread allocation monitor (TAM) may obtain thread information in response to receipt of a notification that a memory management algorithm (e.g., a GC process) has been initiated. The thread information may include, inter alia, a thread name, thread identifier (ID), a memory allocation for the thread, a stack name of a stack to which the thread belongs, an application ID, a user ID, a tenant or organization ID, and/or the like. In embodiments, the TAM may also obtain thread information from a previous memory management algorithm cycle (e.g., a previous GC cycle), which may be compared to the thread information of the current memory management algorithm cycle (e.g., a current GC cycle). In embodiments, the TAM may generate a thread allocation record for individual threads that are currently running based on the comparison. In embodiments, the TAM may aggregate all of the generated thread allocation records for the current memory management algorithm cycle (e.g., a current GC cycle) into a thread allocation snapshot. In embodiments, the thread allocation snapshot may be stored in memory for use during later the memory management algorithm cycles (e.g., a GC cycle). In embodiments, the thread allocation snapshot (or multiple snapshots) may also be used to generate metering/monitoring information for tenants or organizations running applications that use threads causing high resource utilization.

In some embodiments, the TAM may, in response to receipt of the notification, invoke and/or call other context information collection functions and/or applications to obtain thread information and/or context information (e.g., metadata) about currently running threads, which may be included in the thread allocation records of a thread allocation snapshot. In some embodiments, the TAM may disable threads having a resource utilization that exceeds a predetermined or selected threshold, or may invoke/call another function to disable such threads. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to enterprise social networking and/or multi-tenant database systems, those of ordinary skill in the art should understand that the disclosed techniques are neither limited to such systems and can be implemented in the context of various other computing systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1A shows a block diagram of an example of an environment 10 in which an on-demand database service can be used in accordance with some implementations. The environment 10 includes user systems 12, a network 14, a database system 16 (also referred to herein as a "cloud-based system", "computing system", or "system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant system (MTS). The terms "multi-tenant system", "multi-tenant database system", and the like can refer to those systems in which various elements of hardware and software of a computing system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system and/or computing system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
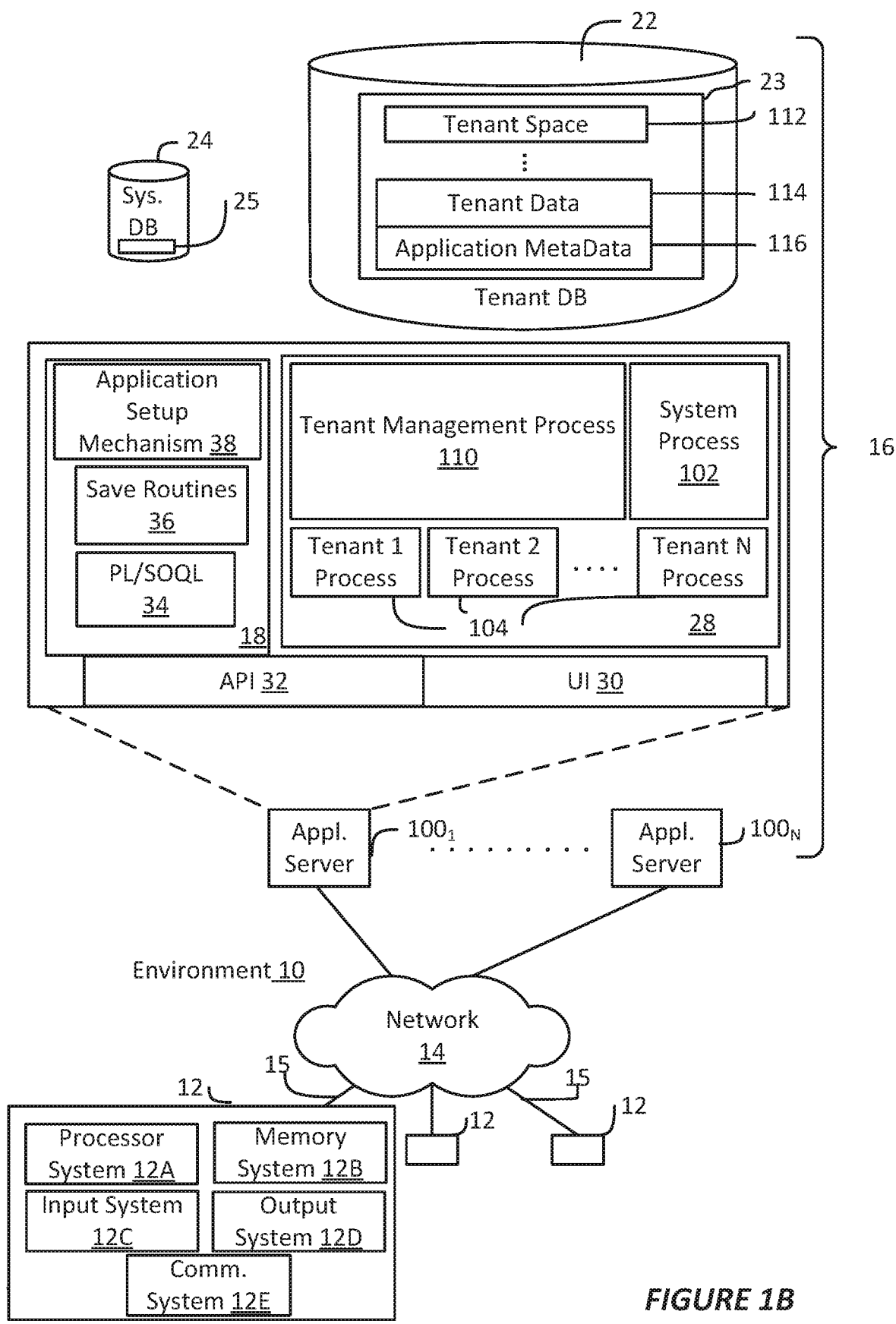
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," "networking layer tunnel 15," and the like) through which the user system 12 may communicate with the system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

In FIG. 1B, the network interface 20 may be implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The application servers $100_1$-$100_N$ may include their own processor systems, memory systems, input and output systems, network interface/communications systems, etc. that are the same or similar to the other processor systems, memory systems, input and output systems, network interface/communications systems discussed herein. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system, such as system 16.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
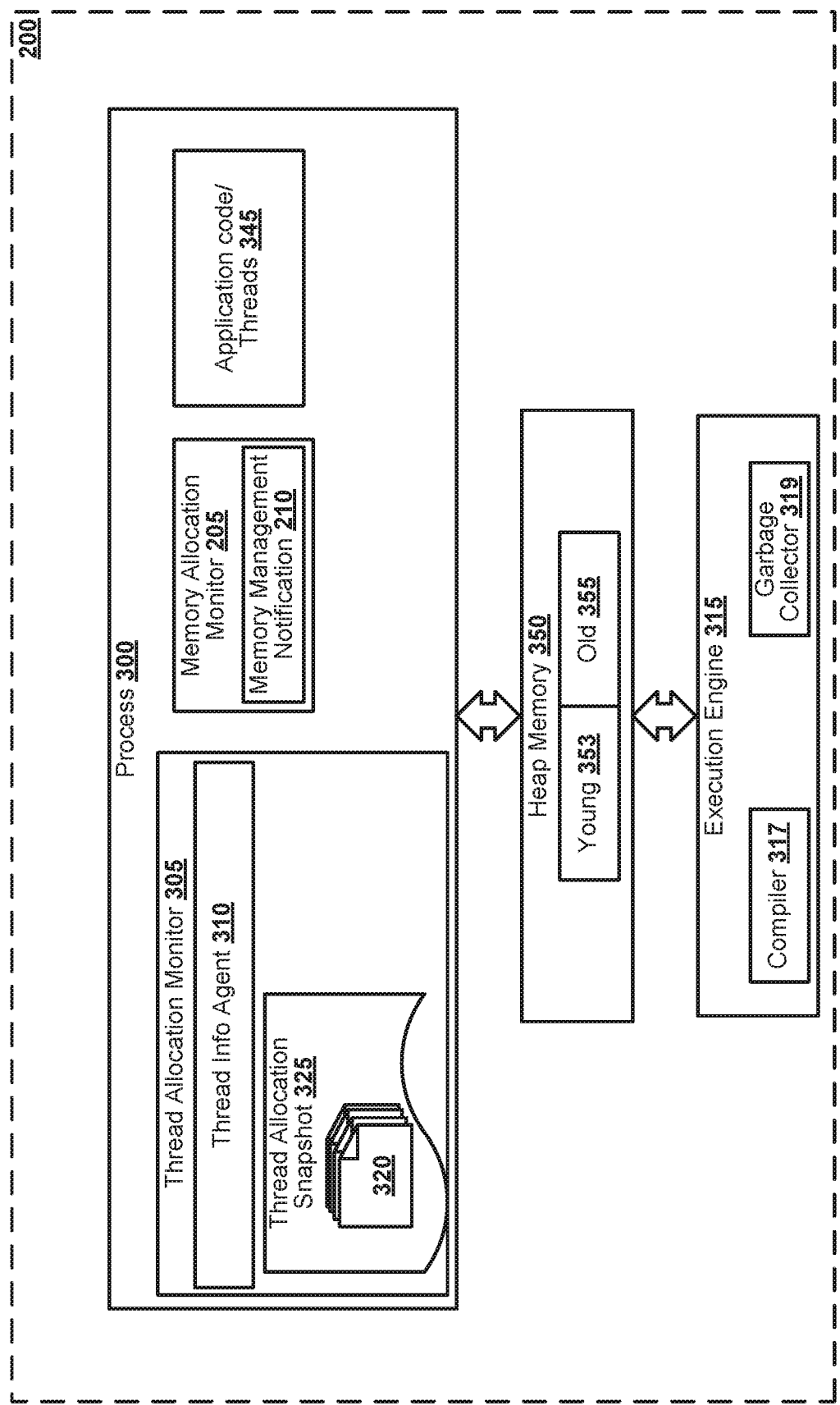
FIG. 2 illustrates an environment 200 in which various example embodiments may be practiced.

FIG. 2 illustrates an environment 200 in which various example embodiments may be practiced. The following description is provided for an example environment 200 that operates using garbage collection (GC) processes in order to reclaim memory space. However, the example embodiments are not limited in this regard and the described embodiments may apply to other memory allocation schemes. In various examples, the environment 200 may be implemented in or by any computing system described herein, or component thereof, such as the system 16 and/or the application servers $100_{1-N}$ described with reference to FIGS. 1A-B. The environment 200 may be implemented using circuitry, such as a processor system that is the same or similar to those discussed with regard to FIGS. 1A-1B. In embodiments, the processor system may comprise one or more general purpose processors to be transformed into one or more special purpose processors to perform any of operations described herein responsive to accessing instructions stored in an electronic memory.

As shown, the environment 200 may include heap memory 350 and execution engine 315. The heap memory 350 may be a space or regions within a memory system that is dynamically and/or randomly managed. At any given time, some parts of the heap memory 350 may be in use, while other parts of the heap memory 350 may be unused (free) and available for allocations requests. During operation, instances and/or objects of the application code 345 may be stored in the heap memory 350, and when an instance and/or object is not referenced anymore, that instance and/or object may become eligible for eviction (deletion) from the heap memory 350. As used herein, the term "instance" may refer to a concrete occurrence of an object, which may occur, for example, during execution of application code 345. As used herein, the terms "instantiate", "instantiation", etc. may refer to the creation of an instance. As used herein, the term "thread" may refer to a sequence of instructions that can be allocated to memory (e.g., heap memory 350) and/or scheduled for execution by a processor system. A thread may include one or more instances and/or objects. The instances/objects may be evicted (deleted) from the heap memory 350 during a GC process/cycle. The specific procedures for allocating space to the heap memory 350 and deleting data from the heap memory 350 may be platform and/or implementation specific.

The heap memory 350 may include a young area 353 (also referred to as a "young generation 353" and the like) and an old area 355 (also referred to as an "old generation 355" and the like). The young generation 353 may store objects/instances that are newly created. When the young generation fills up and/or reaches a threshold memory allocation, a minor GC cycle may be initiated. Objects/instances that survive one or more GC cycles may be "aged" and eventually moved into the old generation 353. The old generation 355 may store long surviving objects/instances, and a major GC cycle may be initiated when the old generation 355 becomes full and/or reaches a threshold memory allocation. The threshold memory allocation for initiating the minor GC cycle may be different than the threshold memory allocation for initiating the major GC cycle.

Although not shown by FIG. 2, the heap memory 350 may include additional or alternative regions/areas, and/or the young area 353 and/or the old area 355 may include additional sub-regions. For example, in embodiments where the environment 200 includes Java Virtual Machine (JVM) implementations, the heap memory 350 may further include a permanent generation; the young area 353 may include an Eden region, a survivor space 0 (S0), and a survivor space 1 (S1); and the old area 355 may include a tenured region. Other implementations are possible in other embodiments.

The environment 200 may also include an execution engine 315, which may comprise a compiler 317 and a garbage collector 319. The compiler 317 may transform the application code/thread 345 into another form, such as bytecode, machine language, object code, etc., which may be executed by the execution engine 315. The garbage collector 319 may be program code or software module(s) configured to execute GC processes, such as the minor and major GC processes discussed previously. The garbage collector 319 may be any type of garbage collector, such as a serial garbage collector, a parallel garbage collector, a concurrent mark sweep (CMS) garbage collector, a G1 garbage collector, and/or the like. A GC process/cycle (also referred to as "garbage collection") may be a process that identifies and reclaims memory space occupied by instances/objects that are no longer in use by the application code/threads 345.

As shown, the environment 200 may also include process 300. The process 300 may be an instance of an application container, virtual machine (e.g., JVM), etc. that may execute program code, such as the application code/threads 345 (also referred to as "application code 345" or "threads 345"), memory allocation monitor (MAM) 205, and thread allocation monitor (TAM) 305.

The application code 345 may be program code, instructions, software module(s), etc. for applications developed by users and/or tenants of a computing system. The applications may be configured to interact with user/tenant data stored in the computing system. The application code 345 may be made up of multiple threads that may execute concurrently. The application code 345 may be developed using various development tools and/or programming languages, such as server-side development tools and/or programming languages (e.g., PHP, Node.js, ASP.NET, etc.) and/or platform-specific development tools and/or programming languages (e.g., Apex, Visualforce®, Force.com IDE®, Android® Studio™ IDE, Apple® iOS® SDK, etc.).

The MAM 205 may be program code and/or software module(s) configured to monitor the memory allocation of the memory system. In embodiments, the MAM 205 may include a memory management notification (MMN) entity 210, which may be program code and/or software module(s) configured to monitor the memory allocation of the heap memory 350. In such embodiments, the MMN entity 210 may obtain GC notifications from the garbage collector 319 when a GC process is triggered or initiated. A GC process may be triggered or initiated, for example, when a memory allocation of the heap memory 350 reaches a threshold level.

In embodiments where the environment 200 includes JVM implementations, the MAM 205 may comprise one or more MBean monitors or Notification Listeners that obtain notifications from various entities using, for example, the MemoryManagerMXBean interface. Additionally, the MMN entity 210 may be an MBean monitor or Notification Listener configured to monitor the garbage collector 319 for GC notifications using, for example, the GarbageCollector-MXBean interface.

The TAM 305 may be program code and/or software module(s) configured to collect thread information (e.g., metadata) and/or other context information for executing threads when a GC cycle/process is triggered/initiated. The thread information may indicate, among other things, a coarse grained total memory allocated for a thread during a major and/or minor GC cycle.

The TAM 305 may implement or control a thread information agent (TIA) 310 to capture or obtain current thread information, which is thread information for currently running threads of the application code/threads 345. The TAM 305 may also implement or control the TIA 310 to capture or obtain previous thread information, which is thread information for threads that ran during a previous GC cycle. The previous thread information may be stored in the heap memory 350 or some other area/region of the memory system. In some cases, a thread may have run during both the current and previous GC cycles. Additionally, the TAM 305 may store current thread information in the heap memory 350 to be used for analyzing threads that run during future GC cycles.

For example, in embodiments where the environment 200 includes JVM implementations, the actual (total) amount of memory allocated during a GC cycle may be derived from the GcInfo class corresponding to, for example, the young generation 353. The GcInfo class may provide methods/procedures for obtaining Gc information regarding a current GC cycle. The GC information may include, for example, a duration of the GC cycle (e.g., getDuration( )), a start time of the GC cycle (e.g., getStartTime( )), an end time of the GC cycle (getEndTime( )), a memory usage before the GC cycle is triggered (e.g., getMemoryUsageBeforeGc( )), a memory usage after the GC cycle is triggered (e.g., getMemoryUsageAfterGc( )), and/or other like GC related information. Additionally, in such implementations, the TIA 310 may use the ThreadMXBean interface to obtain a thread information, such as a thread identifier (thr_id) (e.g., using getId( )) a total aggregated memory allocated for a thread (e.g., using getThreadAllocatedBytes( )) which returns an approximation of the total amount of memory, in bytes, allocated in heap memory for the thread of the specified ID), a memory state (e.g., stack dump, etc.), and/or the like.

Additionally, the TIA 310 may obtain other types of thread information and/or context information of a currently running thread, such as a thread name, application name and/or identifier, a tenant name and/or identifier, a user name and/or identifier, an organization name and/or identifier, a location of the thread (e.g., a memory area in a memory system where application code/threads 345 is located, a uniform resource locator (URL) of application code 345 that includes the thread, etc.), and/or other like information.

The TAM 305 may compare the thread information of the previous GC cycle with the thread information of the current GC cycle to determine an aggregate memory allocation for currently running threads. The term "thread memory allocation" as used herein may refer to an amount of memory allocated to an individual thread, which in some embodiments, may be expressed as a percentage or a difference (delta) between a thread memory allocation during the current GC cycle and a thread memory allocation during a previous GC cycle. The thread memory allocation may also be expressed as a percentage of the total memory allocation of the heap memory 350 and/or as a percentage of memory space of the memory system.

By determining the thread memory allocation, the TAM 305 may identify one or more threads that are likely to have triggered the GC cycle, which may indicate that those threads cause relatively high memory allocation and/or relatively high processor utilization thereby degrading system performance. Such threads may be referred to as "inefficient threads", "resource intensive threads", and the like. In some embodiments, the TAM 305 may use obtained application context information to identify an application to which resource intensive threads belong, or an area in the application code where resource intensive threads are located.

In embodiments, the TAM 305 may generate thread allocation records 320 for individual threads based on a corresponding delta. A thread allocation record 320 may be a record (e.g., including one or more data elements in a database object) that includes thread information and/or application context information for an individual thread that operates during the current GC cycle. Additionally, the TAM 305 may aggregate all of the generated thread allocation records 320 for the current GC cycle into a thread allocation snapshot 325. The TAM 305 may also store the generated thread allocation snapshot 325 for use during later GC cycles. The generated thread allocation snapshot 325 may be stored in the heap memory 350 or some other area of the memory system. The thread allocation snapshot 325, or thread allocation snapshots 325, may be used to generate metering/monitoring information for users/tenants that developed application code 345 so that those users/tenants may build more efficient applications. In some embodiments, the TAM 305 may disable inefficient threads that cause memory utilization to exceed a predetermined or selected threshold aggregate memory allocation, or the TAM 305 may invoke/call some other function to disable inefficient threads.

Figure 3:
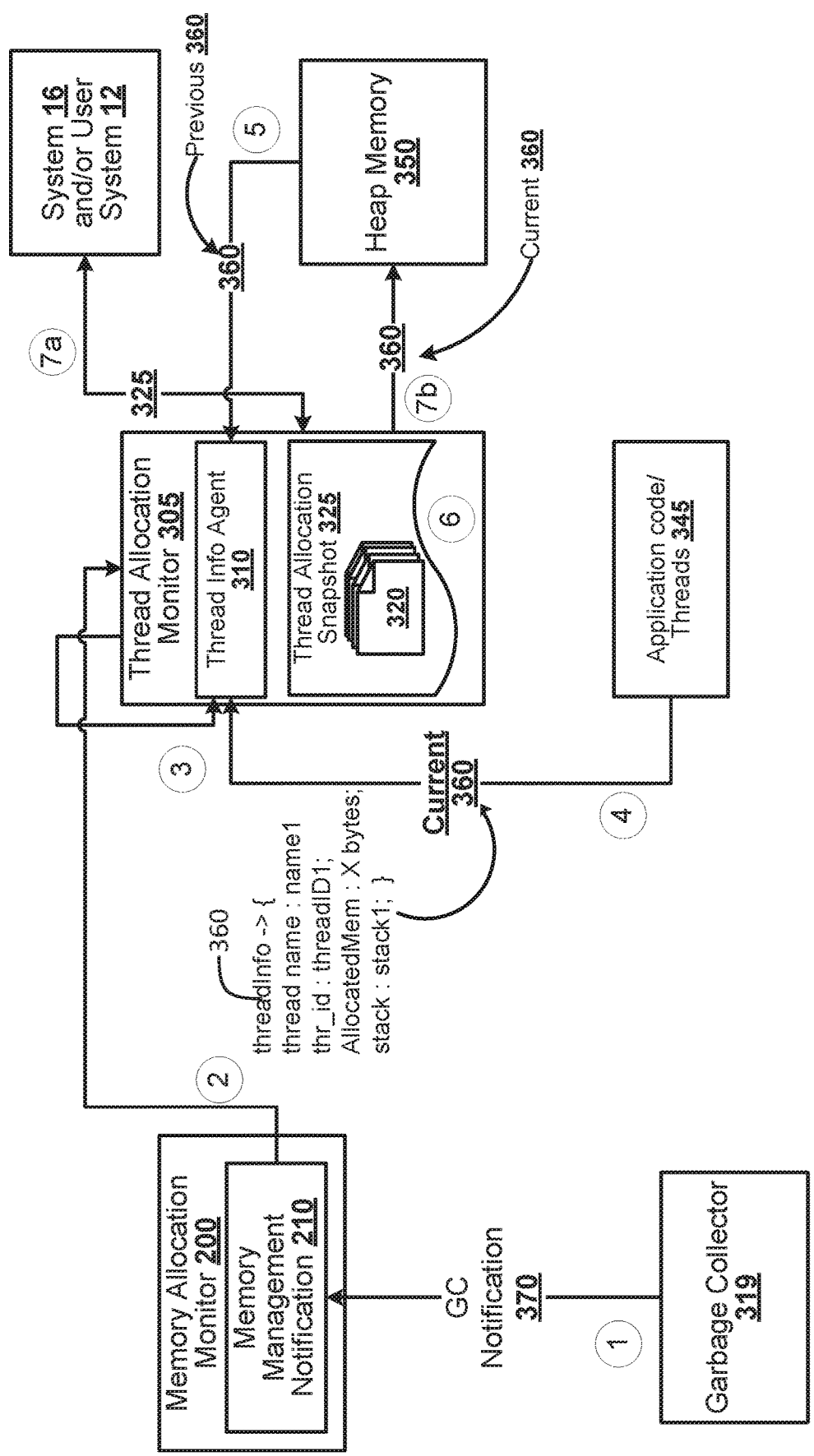
FIG. 3 illustrates logical interaction points between elements of environment 200, in accordance with various embodiments.

FIG. 3 illustrates logical interaction points between elements of environment 200, in accordance with various embodiments. In FIG. 3, like numbered items are as described with respect to FIG. 2. The elements of environment 200 may operate as follows.

At operation 1, the garbage collector 319 may initiate or trigger a GC process, such as when the heap memory 350, or a portion thereof, reaches a predetermined memory allocation. This may cause the garbage collector 319 to broadcast a GC notification 370, which may be obtained by the MMN entity 210.

At operation 2, the MMN entity 210 may trigger, invoke, call, or otherwise instruct the TAM 305 to determine thread memory allocation for currently running threads.

At operation 3, the TAM 305 may trigger, invoke, call, or otherwise instruct the TIA 310 to collect thread information 360 from the application code/threads 345.

At operation 4, the TIA 310 may collect current thread information 360 from the application code/threads 345. In embodiments, the current thread information 360 may comprise, for each currently running thread, a thread name, a thread ID (thr_id), an allocated memory (e.g., in bytes), and a stack name of the stack to which the thread belongs. In some embodiments, the TIA 310 may also other thread information and/or context information, such as a start and/or end time of the thread, an application identifier (app_id) of an application or application code that includes the thread, an a tenant or organization identifier (org_id) of an organization that operates/owns/develops the application, a uniform resource locator (URL) of the application code 345, a memory state (e.g., stack dump, etc.), etc.

At operation 5, the TIA 310 may collect previous thread information 360 from the heap memory 350, for example. The previous thread information 360 may include the same or similar types of information as the current thread information 360. The TIA 310 may then provide the current thread information 360 and the previous thread information 360 to the TAM 305.

At operation 6, the TAM 305 may generate individual thread allocation records 320 for corresponding threads, and may aggregate the thread allocation records 320 into a thread allocation snapshot 325. An example process for generating thread allocation records 320 and thread allocation snapshots 325 is shown and described with regard to FIG. 4.

At operation 7a, the TAM 305 may send the thread allocation snapshot 325 to the user system 12 and/or the system 16 (see e.g., FIG. 1B). In various embodiments, captured data (e.g., the thread allocation snapshot 325) could be used to raise alarms/flags and/or may be persisted in a data store or memory system for system-wide analysis to try and discover/identify common heavy memory consuming threads. The thread allocation snapshot 325 can also be used to understand if a particular user/tenant or feature is not working as designed, which may allow user/tenants to disable or correct such features.

In an example, the TAM 305 (or some other entity/component) may compile or format the thread allocation snapshot 325 into user interface data, which may comprise various data or data objects in a computer-readable form that can be compiled and rendered as a visual representation by the output system 12D (see e.g., FIG. 1B). For example, the user interface data may be one or more Extensible Markup Language (XML) documents, one or more JavaScript Object Notation (JSON) documents, and/or some other suitable data format that may be decoded and rendered by an application container and/or a browser implemented by the user system 12. When this message is received by the user system 12, the processor system 12A may extract the user interface data and generate a visual representation, which may be displayed using the output system 12D. In another example, the TAM 305 (or some other entity/component) may compile or format the thread allocation snapshot 325 into a report for consumption by a system administrator or other privileged user. In response to the report, the user system 12 may transmit a command to disable one or more inefficient threads.

In another example, the TAM 305 may analyze the thread allocation snapshot 325 to identify resource intensive threads, such as threads that meet or exceeded a threshold thread memory allocation, or a predetermined or selected number of threads that use the more resources than other threads. In such embodiments, the TAM 305 may disable, or may instruct some other entity/component of the system 16 to disable the resource intensive threads.

At operation 7b, the TAM 305 may store the thread allocation snapshot 325 in the heap memory 350 (or some other memory location) for use during a next GC cycle. The specific location where the thread allocation snapshot 325 is stored in memory may be implementation specific, however, in some embodiments the thread allocation snapshot 325 may be stored in the old generation 355 (see e.g., FIG. 2).

Figure 4:
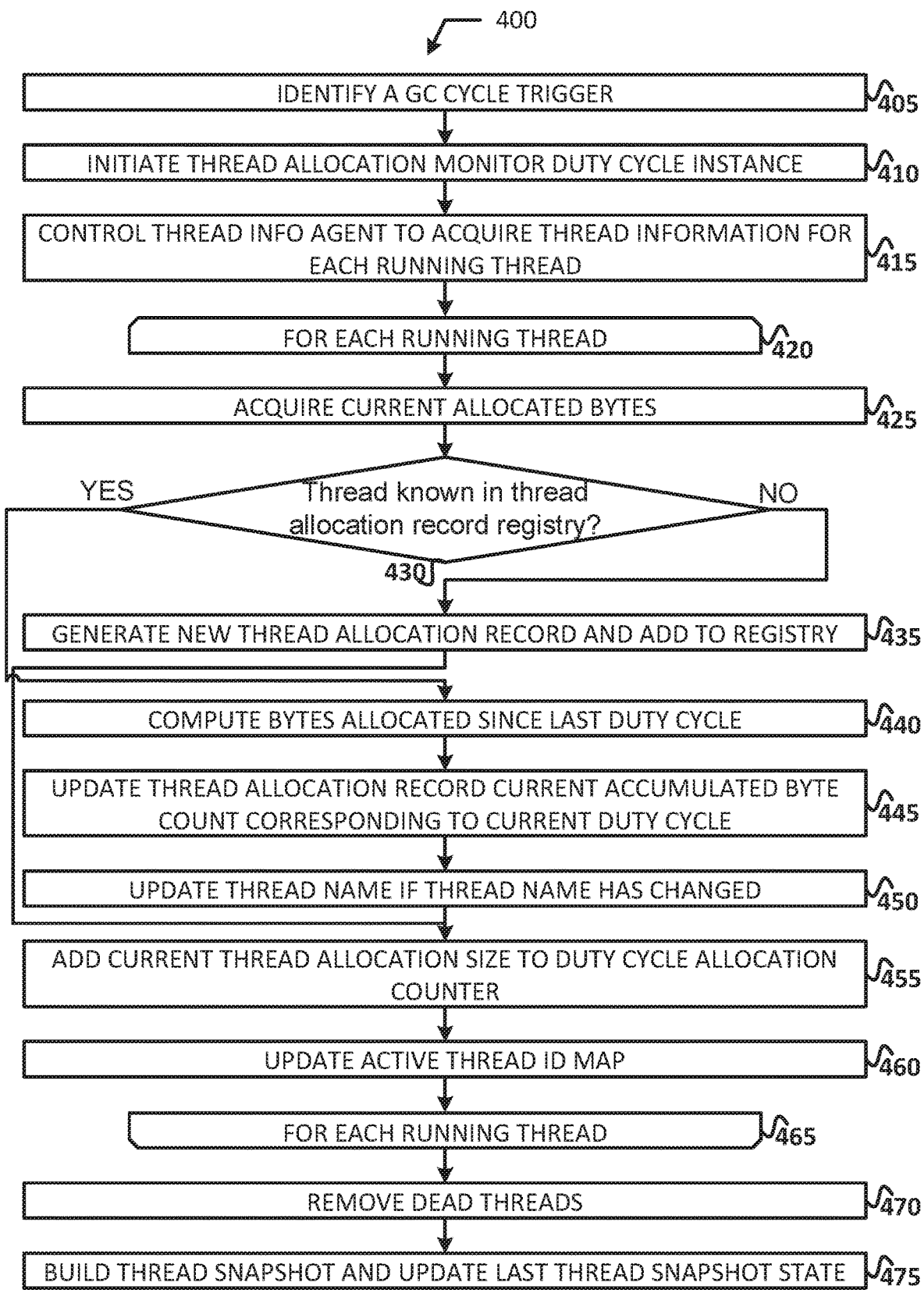
FIG. 4 illustrates a process for determining an aggregate thread memory allocation for one or more threads, in accordance with various embodiments.

FIG. 4 illustrates a process 400 for determining an aggregate thread memory allocation for one or more threads, in accordance with various embodiments. For illustrative purposes, the operations of process 400 is described as being performed by the TAM 305 discussed with regard to FIG. 2. However, it should be noted that other computing devices may operate the process 400 in a multitude of implementations, arrangements, and/or environments. For example, a computer system may include program code, which when executed by one or more processors of the computer system, causes the computer system to perform the various operations of process 400. While particular examples and orders of operations are illustrated in FIG. 4, in various embodiments, these operations may be re-ordered, separated into additional operations, combined, or omitted altogether.

Process 400 may begin at operation 405, a processor system may implement the TAM 305 to identify a GC cycle trigger. In embodiments, the TAM 305 may identify the trigger based on a command, instruction, function/application call, etc. obtained from the MMN entity 210, and the command, instruction, function/application call, etc. may be based on a GC notification issued by the garbage collector 319 (see e.g., operations 1 and 2 shown and described with regard to FIG. 3). The GC notification may indicate that a threshold memory utilization of a memory area (e.g., the heap memory 350 or a portion thereof) has been met. Based on the identified trigger, at operation 410 the processor system may implement the TAM 305 to initiate an instance of a TAM 305 duty cycle, which may include processes for generating a thread allocation snapshot 325 for the current GC cycle.

At operation 415, the processor system may implement the TAM 305 to control, instruct, call the TIM 310 to acquire thread information (e.g., metadata) for each running thread. The processor system may implement the TAM 305 to processes thread information for each running thread in turn beginning in starting loop operation 420. At operation 425, the processor system may implement the TAM 305 to acquire current allocated bytes for a thread.

At operation 430, the processor system may implement the TAM 305 to determine whether the thread is known or listed in an allocation record registry. In embodiments, the allocation record registry may be a data structure or database object that indicates the previous thread information 360, which may be obtained from heap memory 350 or some other memory location (see e.g., operation 5 discussed with regard to FIG. 3). In some cases, if a thread is not known or listed in the allocation record registry, the thread may not have been running during a previous TAM 305 duty cycle and/or a previous GC cycle. Therefore, threads that are not listed in in the allocation record registry are less likely to have contributed to the current memory allocation reaching exceeding or meeting the threshold level. If at operation 430 the TAM 305 determines that the thread is not known in an allocation record registry, the TAM 305 may proceed to operation 435 to generate a new thread allocation record 320 for the thread and then proceed to operation 455 to be added to the thread allocation counter (discussed infra).

If at operation 430 the TAM 305 determines that the thread is known or listed in the allocation record registry, the TAM 305 may proceed to operation 440 to compute the bytes allocated since a last TAM 305 duty cycle, which may have been triggered by a previous GC cycle. In some cases, if a thread is known or listed in the allocation record registry, the thread may have been running during the previous TAM 305 duty cycle and/or a previous GC cycle. Therefore, some of these threads are more likely to have contributed to the current memory allocation reaching exceeding or meeting the threshold level. At operation 440, the TAM 305 may determine a delta or aggregate thread memory allocation by comparing a current thread memory allocation with a previous thread memory allocation during the previous GC cycle. In some embodiments, the delta or aggregate thread memory allocation may be a difference between a first memory allocation for a thread when the current GC cycle was initiated or triggered (e.g., a first time that the threshold memory utilization was met) and a second memory allocation for the thread when the previous GC cycle was initiated or triggered (e.g., a second time that the threshold memory utilization was met).

At operation 445, the processor system may implement the TAM 305 to update the thread allocation record 320 current accumulated byte count corresponding to the current TAM 305 duty cycle and/or the current GC cycle. In embodiments, the current accumulated byte count may be an entry or data element in the thread allocation record 320 that stores the current thread memory allocation obtained at operation 425. At operation 450, the processor system may implement the TAM 305 to update a thread name and/or thr_id data element in the thread allocation record 320 if the thread name and/or thr_id has changed since the last TAM 305 duty cycle and/or previous GC cycle. In some cases, the thr_id may be a unique value assigned to a thread during its lifetime, which may be reused when the thread is terminated.

At operation 455, the processor system may implement the TAM 305 to add the current thread memory allocation size (e.g., in bytes) to a duty cycle allocation counter. In embodiments, the current thread allocation size may be the delta or change in a thread's memory allocation since the previous TAM 305 duty cycle and/or previous GC cycle. In embodiments, the duty cycle allocation counter may be an entry or data element in the thread allocation record 320 that stores the delta thread memory allocation determined at operation 440. If the thread was not listed in the allocation record registry (see e.g., operation 430), then the current allocated bytes obtained at operation 425 may be stored in the duty cycle allocation counter.

At operation 460, the processor system may implement the TAM 305 to update an active thread ID map. In embodiments, the thread ID map may indicate an association between a thread ID and a memory location where the thread is stored in the heap memory 350 and/or where in the application code 345 the thread is located. In ending loop operation 465, the processor system may implement the TAM 305 to return to operation 420 to process thread information for a next pending thread (if any).

At operation 470, the processor system may implement the TAM 305 to remove (delete) any dead threads that are allocated to the heap memory 350. At operation 475, the processor system may implement the TAM 305 to build/generate a thread allocation snapshot 325 and update a last thread snapshot state. In embodiments, the top threads and corresponding thread information (e.g., percentage of memory allocation, memory state (e.g., stack dump, etc.), bytes allocated, etc.) that contributed to the memory consumption in the last GC cycle iteration may be logged in the thread allocation snapshot 325. In embodiments, updating the last snapshot state may include storing the generated thread allocation snapshot 325 in the heap memory 350 (or some other memory location) for use during a future TAM 305 duty cycle and/or GC cycle. After execution of operation 475, the process 400 may end or repeat as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer program stored on a non-transitory computer- readable media and to be implemented by computing system, the computer program comprising a set of instructions, that when executed by one or more processors of the computing system, is operable to cause the computing system to:
- detect initiation of a current garbage collection (GC) cycle based on a threshold memory utilization being met;
- collect, for each thread of a set of currently running threads in response to detection of the initiation of the current GC cycle, current thread information (CTI) and previous thread information (PTI),
  - the CTI for a respective thread of the set of currently running threads indicating a current memory allocation for the respective thread during the current GC cycle,
  - the PTI for the respective thread of the set of currently running threads indicating a previous thread memory allocation for the respective thread during a previous GC cycle, and
  - both the CTI and the PTI indicating an application to which the respective thread belongs;
- determine an aggregate thread memory allocation for each thread, the aggregate memory allocation for each thread being a difference between the current memory allocation and the previous thread memory allocation; and
- provide an indication indicating at least one feature of at least one application including one or more threads of the set of currently running threads potentially triggered the current GC cycle based on whether the aggregate thread memory allocation met or exceeded a threshold memory allocation.

2. The computer program of claim 1, when executed by the one or more processors is further operable to cause the computing system to:
- disable the one or more threads when the aggregate thread memory allocation is greater than or equal to the threshold memory allocation.

3. The computer program of claim 1, wherein, to detect that the threshold memory utilization has been met, the set of instructions when executed by the one or more processors is operable to cause the computing system to:
- obtain a GC notification from a memory system, the GC notification indicating that a GC process for the current GC cycle has been initiated, and the GC process is initiated when the threshold memory utilization is met.

4. The computer program of claim 3, wherein the set of instructions when executed by the one or more processors is operable to cause the computing system to:
- obtain, as part of the CTI, a total aggregated memory allocated for each currently executing thread via a GarbageCollectorMXBean interface;
- obtain, as another part of the CTI, other metadata associated with each currently executing thread;
- obtain the PTI from a heap memory; and
- store the CTI in the heap memory as PTI for a next GC cycle.

5. The computer program of claim 4, wherein the set of instructions when executed by the one or more processors is operable to cause the computing system to:
- generate a thread allocation record for the one or more threads to include the aggregate thread memory allocation; and
- generate a thread allocation snapshot to include the thread allocation record and one or more other thread allocation records.

6. The computer program of claim 5, wherein the set of instructions when executed by the one or more processors is operable to cause the computing system to:
- generate a new thread allocation record for a thread of the one or more threads when the PTI of the thread does not indicate that individual threads ran during the previous GC cycle; and
- determine the aggregate thread memory allocation for the one or more threads to be a current thread memory allocation of the thread.

7. The computer program of claim 5, wherein the set of instructions when executed by the one or more processors is operable to cause the computing system to:
- insert the aggregate thread memory allocation into a thread allocation record for a thread of the one or more threads when the PTI of the thread indicates that the thread ran during the previous GC cycle.

8. The computer program of claim 5, wherein the set of instructions when executed by the one or more processors is operable to cause the computing system to:
- store the thread allocation snapshot in a memory system; and
- generate the indication that the one or more threads have met or exceeded a threshold memory allocation based on the thread allocation snapshot.

9. A computing system comprising:
- a processor system communicatively coupled with a memory system, the memory system configurable to store program code of a Thread Allocation Monitor (TAM) including a Thread Information Agent (TIA),
- the processor system configurable to operate the TAM to:
  - obtain, from a Memory Management Notification (MMN) entity, an instruction to determine thread memory allocation for currently running threads, the instruction being based on a trigger of a current garbage collection (GC) cycle,
  - operate the TIA to collect current thread information (CTI) of each currently executing thread of a set of currently executing threads based on the trigger,
  - obtain previous thread information (PTI) of each currently executing thread that ran during a previous GC cycle, both the CTI and the PTI comprising an application to which the respective thread belongs, a thread name, a thread ID, an allocated memory, and a stack name of a stack to which the thread belongs,
  - generate a thread allocation snapshot comprising a thread allocation record for each of the currently executing threads, each thread allocation record indicating an aggregate thread memory allocation for a corresponding currently executing thread of the currently executing threads and an application to which the corresponding currently executing thread belongs, the aggregate thread memory allocation being a difference between a current thread memory allocation for each currently executing thread during the current GC cycle and a previous thread memory allocation for each currently executing thread during the previous GC cycle, and
  - store the thread allocation snapshot in the memory system; and
- an interface system communicatively coupled with the processor system, the interface system configurable to:
  - transmit a report based on the thread allocation snapshot to a user system, the report indicating the at least one feature of at least one application including one or more threads of the set of currently executing threads that potentially triggered the current GC cycle; and
  - receive, from the user system, an instruction to disable or correct at least one feature of at least one application including one or more threads of the currently executing threads that potentially triggered the current GC cycle.

10. The computing system of claim 9, wherein the processor system is configurable to:
identify individual threads of the currently executing threads having an aggregate thread memory allocation greater than or equal to a threshold memory allocation; and
disable the identified individual threads.

11. The computing system of claim 9, wherein the processor system is configurable to operate a memory management notification entity to:
obtain a GC notification from a garbage collector, the GC notification indicating that the current GC cycle has been triggered, and the current GC cycle is triggered when a threshold memory utilization for a heap memory has been met or exceeded; and
send the trigger of the current GC cycle to the thread allocation monitor.

12. The computing system of claim 11, wherein the processor system is configurable to:
determine the aggregate thread memory allocation for each of the currently executing threads, wherein, to determine the aggregate thread memory allocation for each of the currently executing threads, the processor system is configurable to:
determine a current thread memory allocation for each of the currently executing threads based on the CTI, and the current thread memory allocation is the current thread memory allocation; and
determine the previous thread memory allocation for each of the currently executing threads based on the PTI.

13. The computing system of claim 9, wherein the interface system is configurable to:
obtain, from the user system, a command to disable one or more threads.

14. A computer program stored on a non-transitory computer-readable media and to be implemented by a computing system, the computer program comprising a set of instructions, which when executed by at least one processor of a computing system is operable to cause the computing system to:
identify, by a Memory Management Notification (MMN) entity of a Memory Allocation Monitor, a trigger of a current garbage collection (GC) cycle;
initiate a thread allocation monitor (TAM) duty cycle instance of a TAM based on the trigger;
collect, by a Thread Information Agent of the TAM, current thread information (CTI) for each thread of currently running threads and previous thread information (PTI) for each of the currently running threads that ran during a previous GC cycle, the CTI including current thread memory allocations for each thread running during the current GC cycle, the PTI including previous thread memory allocations for each thread that ran during the previous GC cycle, and both the CTI and the PTI comprising an application to which the respective thread belongs, a thread name, a thread ID, an allocated memory, and a stack name of a stack to which the thread belongs;
determine, by the TAM, an aggregate thread memory allocation for each of the currently running threads based on the current thread memory allocations for individual threads and the previous thread memory allocations for the individual threads;
generate, by the TAM, a thread allocation snapshot comprising thread allocation records, the thread allocation records indicating the aggregate thread memory allocation of each thread of the currently running threads and an application to which each thread belongs; and
store, by the TAM, the thread allocation snapshot in memory;
provide, by the TAM to a user system, a report indicating at least one feature of at least one application including one or more threads of the set of currently executing threads that potentially triggered the current GC cycle; and
disable or correct, by the TAM, the at least one feature of the at least one application in response to receipt of an instruction from the user system.

15. The computer program of claim 14, wherein the set of instructions when executed are further operable to cause the computing system to:
disable one or more threads of the currently running threads having an aggregate thread memory allocation that is greater than or equal to a threshold memory allocation.

16. The computer program of claim 14, wherein, to identify the trigger of the current GC cycle, the set of instructions when executed is operable to cause the computing system to:
obtain a GC notification from a garbage collector, the GC notification indicating that the current GC cycle has been initiated, and the current GC cycle is initiated when a threshold memory utilization of a heap memory is met.

17. The computer program of claim 16, wherein, to determine the aggregate thread memory allocation for the individuals threads of the currently running threads, the set of instructions when executed is operable to cause the computing system to:
determine a current thread memory allocation for each of the currently running threads based on the CTI;
determine a previous thread memory allocation for each of the currently running threads based on the PTI; and
subtract, for each currently running thread, the previous thread memory allocation from the current thread memory allocation.

18. The computer program of claim 17, wherein, to generate the thread allocation snapshot, the set of instructions when executed is operable to cause the computing system to:
generate, for each thread of the currently running threads, a thread allocation record to include a corresponding aggregate thread memory allocation.

19. The computer program of claim 18, wherein the set of instructions when executed is operable to cause the computing system to:
generate a new thread allocation record for each of the currently running threads that did not run during the previous GC cycle when the previous thread information does not indicate that the individual threads ran during the previous GC cycle; and
determine the corresponding aggregate thread memory allocation for each of the currently running threads that did not run during the previous GC cycle to be the current thread memory allocation of the thread.

20. The computer program of claim 18, wherein the set of instructions when executed is operable to cause the computing system to:
insert the aggregate thread memory allocation into a thread allocation record for individual threads of the currently running threads that ran during the previous GC cycle when the previous thread information indicates that the individual threads ran during the previous GC cycle.

* * * * *